B. BOULOGNE.
WEIGHING BEAM FOR AUTOMATIC WEIGHING MACHINES.
APPLICATION FILED AUG. 17, 1921.

1,435,693.

Patented Nov. 14, 1922.

Fig. 1.

Inventor
B. Boulogne,
By Marks & Clerk
attys.

B. BOULOGNE.
WEIGHING BEAM FOR AUTOMATIC WEIGHING MACHINES.
APPLICATION FILED AUG. 17, 1921.

1,435,693.

Patented Nov. 14, 1922.

Inventor
B. Boulogne,
By Marks & Clerk
Attys.

Patented Nov. 14, 1922.

1,435,693

UNITED STATES PATENT OFFICE.

BALTUS BOULOGNE, OF SOERABAIA, JAVA, DUTCH EAST INDIES.

WEIGHING BEAM FOR AUTOMATIC WEIGHING MACHINES.

Application filed August 17, 1921. Serial No. 493,056.

*To all whom it may concern:*

Be it known that I, BALTUS BOULOGNE, mechanical engineer, a subject of the Queen of the Netherlands, residing at Soerabaia, Java, Dutch East Indies, have invented certain new and useful Improvements in Weighing Beams for Automatic Weighing Machines (for which I have applied for patent in the Netherlands January 22nd, 1920), of which the following is a specification.

The invention relates to a weighing beam for automatic weighing machines for the weighing of tare. The meaning of this is that said automatic weighing machines are such that the charge of the receptacle is more than the quantity to be delivered at each weighing, the surplus being retained in the receptacle after each delivery, so that if the receptacle increases in weight through adhering matter or in some other manner, the value of this increase will be compensated for, by an equal weight of matter. In this way any accidental or regular change in the gross weight will not influence the net weight.

To this purpose the weighing beam has, according to the invention, the shape of a bell crank, being placed in such a manner that the arms in their extreme positions are positioned relatively and in regard to a vertical in such a manner that in one of the extreme positions (pouring position) the arm of the weight momentum of the charge, will, in respect to the arm of the momentum of the weighing weight, be so much longer than it is in the other extreme position that, after the pouring out of the quantity of matter weighed off, the weighing lever will return to the other extreme position (charging position) in which position the arm of the momentum of the weighing weight will, in respect to the arm of the weight momentum, be so much smaller again that after the receptacle being refilled again the bell crank must return to the emptying position.

A weighing machine provided with a weighing lever of this style, besides being adapted to weigh the tare, possesses the advantage of working in a simple and easy manner, all movements being obtained in a purely mechanical manner, at the same time guaranteeing sensitivity.

The invention is illustrated in the accompanying drawings, in which—

Fig. 1 is a side view of a weighing machine provided with the weighing beam according to the invention, the receptacle (weighing tank) being shown in section, and the mechanism drawn in the position occupied during the beginning of the charging.

Figure 2:
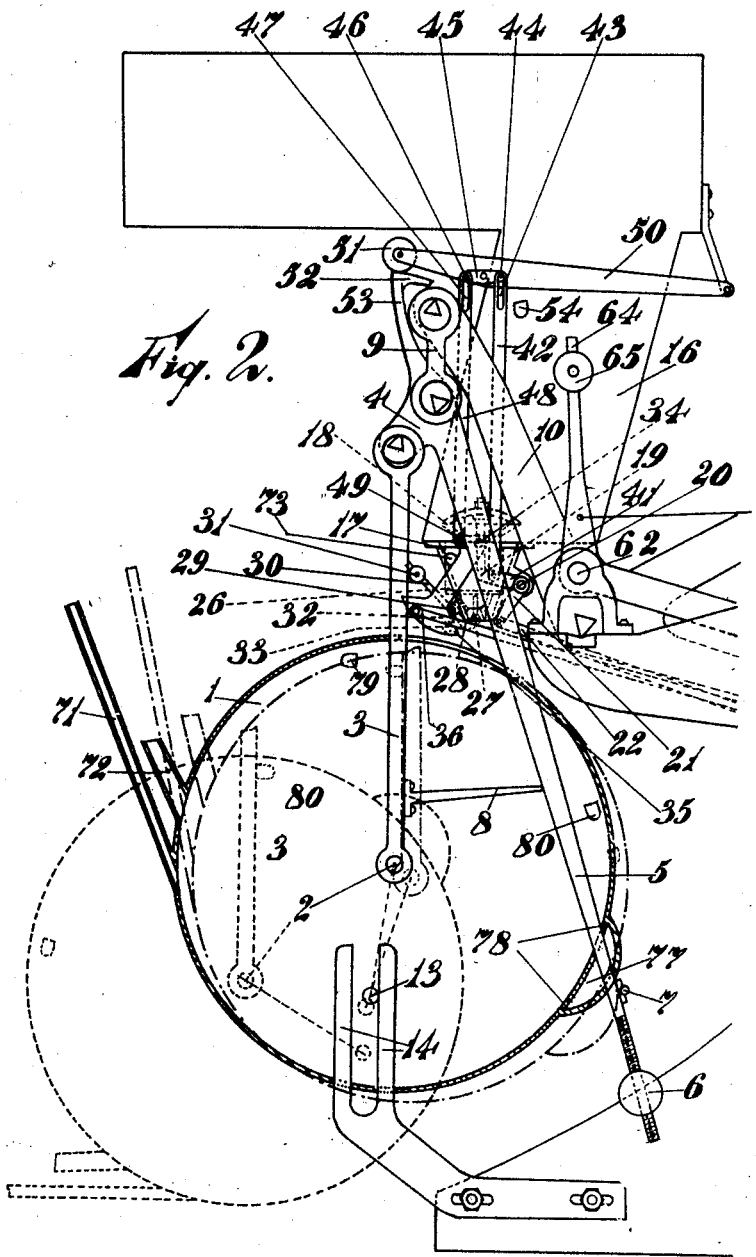
Fig. 2 is a similar enlarged view of the left hand portion of the machine.
Figure 3:
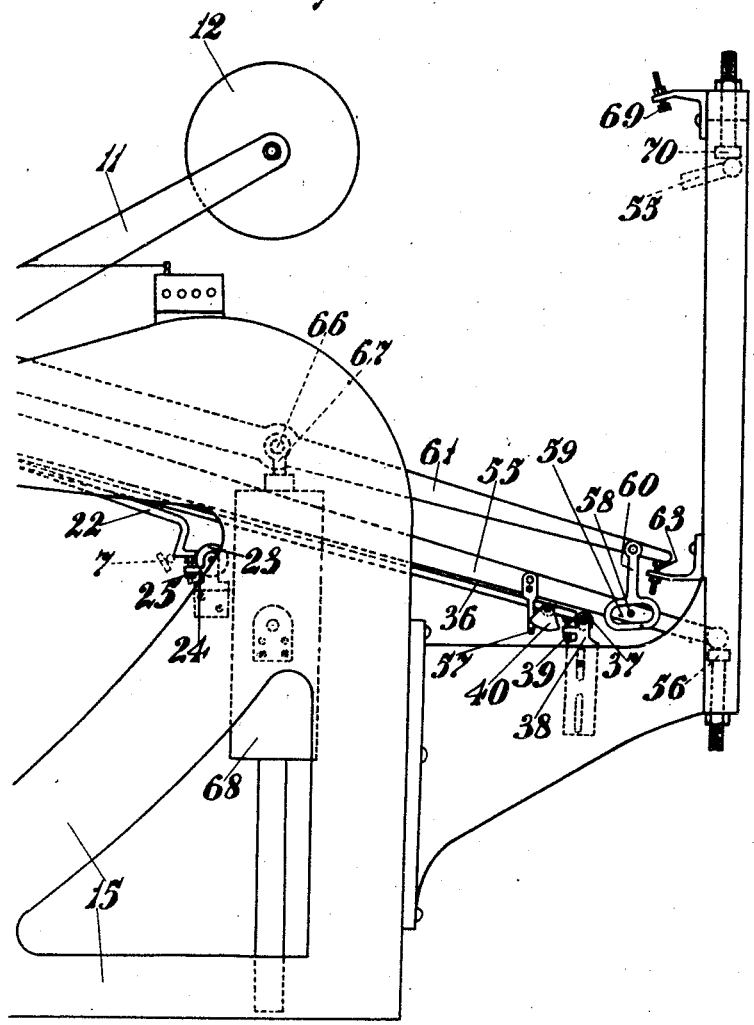
Fig. 3 is a similar view of the right hand portion of the machine.

In Fig. 1, 1 represents the weighing receptacle rotatably supported by the shaft 2. This tank or receptacle is suspended by bars 3 from the short arm 4 of an auxiliary beam, the other arm 5 of which is provided with a running weight 6 and a finger 7. This arm 5 is resting (as drawn) against a stud 8 fixed to the bar 3. The auxiliary weighing beam is suspended from one arm of the bell crank weighing beam 10, the other arm 11 of which carries a weight 12.

The tank is provided with one or more pins 13 (or similar means) each guided in guides 14 fixed somehow and somewhere at the bottom part of the framework.

A tilting of the bell crank 10, 11 causes the pin 13 to engage with one of the sides of the guide 14 resulting in a tilting motion of the tank in accordance with a displacement of the bell crank 10, 11.

Furthermore the tank has two stops 79 and 80, the purpose of which will be explained later on.

The outlet chute 16 of the receptacle for the matter to be weighed, discharges into a funnel 17 and is separated therefrom, by means of a large vertically reciprocating valve 18. A bar 19 is linked to the stem of the valve 18 and is fixed to a shaft 20, the other end of of which projects through the wall of the funnel and carries another bar 21 to which is linked another rod 22, the other end of which bears against a roller 23 when the valve is in the "Open" position (as drawn). The roller 23 is rotatably mounted in a bracket 24 provided with a screw 25 serving as a support for the rod 22.

Independent of the funnel 17, connected to the chute 16 and situated rearwardly of the funnel 17, is a valve chamber 26 provided with a small valve 27. This small valve 27 rests upon the terminal 28 of a toggle lever having its fulcrum at 29, the other arm 30 bearing a counter weight 31. This weight 31 tends to keep the valve closed, but as shown in the drawing, is prevented from actually doing so because a finger 32 of the lever 28, 30 is resting against the pin 33 of a leakage vat 35 which is linked to the funnel 17.

This vat 35 will of itself, turn underneath the outlet of the funnel and of the valve chamber 26, but will be kept aside by means of a rod 36 linked to it, which rod rests against a roller 37, mounted upon a fixed bracket 38.

The rod 36 rests on a set screw 39 and is furthermore provided with a rotatable sector 40. A third lever 41, rotatably fixed on the shaft 20 supports a rod 42, the other end of which has a slot 43, engaging a pin 44, belonging to one arm of a lever 45, the other end of which has a pin 46, engaging the slot 47 of a second rod 48, linked with its free end to a point 49 of the leakage vat 35, situated at that side of it which is moved aside. The balance beam 45 is rotatably fixed to a point of the lever 50, linked to a projecting point of the delivery tank and at its other end provided with a roller 51 which rests upon the nose 52 of an arm 53 belonging to the secondary beam 4, 5. Underneath the lever 50 a lug 54 fixed to the outlet of the tank, limits the lower position of said lever 50.

The weighing beam proper or bell crank 10, 11 has a tail 55, the end of which rests upon an adjustable stop 56 in the shown position.

To this tail a finger 57 is attached, the end of which engages the sector 40, said tail, moreover, carrying a pin 58 making a loose fit with the slot 59 of an eyebar 60. This eyebar is suspended from one arm 61 of a bell crank lever, having its fulcrum at the point 62.

The terminal of this arm 61 of the lever rests as is shown in the drawing, near the eyebar 60, upon an adjustable stop 63, whilst the other arm 64 of said bell crank lever carries a weight 65. At the point 66, the arm 61 of the bell crank lever is linked to the piston rod 67 of a double buffer device 68.

Adjustable stops 69 and 70 limit the extreme positions, respectively of the arm 61 of the bell crank lever and the tail 55.

The weighing tank is provided at one side, with a long and narrow spout 71 and a wider spout 72 and at the opposite side with a pocket 77, which communicates with the tank by ports 78.

The funnel 17 has a stop-lug 73 for the leakage vat 35.

The operation of the weighing is as follows:

Suppose the apparatus to be in the starting position as shown in the drawing. The valves 18 and 27 are open, the liquid runs into the weighing tank 1. According to the proceeding of the filling the secondary or auxiliary weighing beam 4, 5 will change its position.

This will result in the withdrawal of the nose 52 of the arm 53 from under the roller 51, causing the lever 50 to come to rest upon the lug 54, thereby bringing the pins 44 and 46 of the lever 45 to a lower position, moving down in their respective slots 43, 47.

The valves 18 and 27 thus remain in the "Open" position. At the moment that the auxiliary beam has moved so far, that the finger 7 has reached the position indicated in the drawing in dotted lines, it will, on further displacement, lift the bar 22 over the roller 23.

The large valve 18, kept "open" by said bar and the cranks 21 and 19 fixed to the shaft 20, will now seat through its own weight.

The further filling of the tank, however, is effectuated from the material in funnel 17, through the small valve 27.

As soon as the tank is filled so far that it becomes heavier than the weight 12 of the weighing beam, this latter will at once tumble over to the left.

The contents of the tank, at this moment of tumbling, is made up of the quantity to be delivered by each weighing plus the unavoidable remainder to be weighed as tare.

The tail 55 of the weighing beam will, at the moment of said tumbling over, move upwards and will carry along with it the rod 36 by means of the finger 57, engaging with the sector 40 said rod 36 which normally holds the vat 35 open, is now allowed to slide over the roller 37, thereby bringing said vat 35 just underneath the funnel.

At the beginning of the shifting of the leakage vat 35, the pin 33, attached hereto, will set at liberty the finger of the lever 28, 30, which was keeping the small valve 27 in the "Open" position so that, now, said valve 27 will be closed by the weight 31, the leakage vat being underneath.

If the tail 55 moves upwards from its rest 56, the pin 58 fixed to the tail will engage with the upper part of the slot 59 and carry along with it the arm 61 of the bell crank lever, which was resting beforehand upon the set screw 63.

The buffer 68, joined to the arm 61 by means of a link joint, governs the speed of the motion of said arm and consequently also of the weighing beam 10, 11, until the tail 55 touches the stop 70 when in its other extreme position (the pouring position of the tank).

After this, the arm 61 will move towards and up to the stop 69, being actuated by the weight 65 attached to the other end of the arm 64, of the bell crank, thus causing the release of the pin 58 from the upper wall of the slot 59.

As the bell crank weighing beam 10, 11 turns from the loading position into the pouring position, the weighing tank 1 will receive a tilting motion caused by the pins 13 and the guides 14 and will acquire the position indicated in the drawing in dotted lines.

The contents of the tank will be discharged through the spouts 71 and 72, until the weight 12 overbalances the weight of the tank and then said weight will cause the weighing beam to tilt to the right, leaving the remainder of the charge, intended to be weighed as tare in the tank.

The careful weighing of this remainder tare weight causes the correct quantity to be delivered by the tank. The weighing beam in so far differs substantially from other weighing beams in that, in order that the weighing tank may deliver one charge, said beam has to do two weighings, an operation carried out in consequence of its special shape and the accurate fixation of the extreme positions.

The buffer being double acting controls the tilting over of the bell crank lever in the same manner whether it be for the emptying or for the filling position.

The weighing tank is brought home again by means of the pins 13 running between the guides 14.

During the emptying of the weighing tank and before the return tilting of the weighing beam, the auxiliary beam 4, 5 returns to its original position and will again engage the arm 8, thereby bringing its arm 53 to the higher position. As the secondary weighing beam turns to the right, the nose 52 of the arm 53 will lift the roller 51, thus moving the lever 50 upwards, and causing the bar 48 to shift the leakage vat 35 from under the valves 18 and 27.

The pin 33 attached to the leakage vat 35 will touch the finger 32 of the lever 28, 30 as soon as said vat be wholly removed from beneath the funnel 17, thus causing said lever to release the small valve 17 and permit said valve to open.

The large valve 18 being so much heavier, requires a greater force for its lifting than will do for the shifting of the leakage vat, consequently the valve 18 will not move until the leakage vat rests against its stop 73, after which the lever 45 will pull the bar 42 and by so doing will move the lever 41 causing the arm 19 to lift the valve 18.

The bars 22 and 36 have now been brought home by the lever 21 and the leakage vat respectively, and rest against their respective rollers 23 and 37, and the machine has returned to the position for being filled.

As the level of the liquid rises in the tank 1 and the pocket 77 is filled, the tank will turn in a clockwise direction until it reaches the extreme position for charging, this being determined by the stop 79 contacting with the bar 3.

This turning or tilting motion of the weighing tank does not require much power because the rising of the level of the liquid to the spout 72 and the tube 71 diminishes the tendency of the tank to turn clockwise under the influence of the filled pocket 77, and at the moment of tilting of the weighing beam, it is only just large enough to prevent an unintentional tilting of the tank.

The tank performing only the first part of its rotation under the influence of the guides will return of its own volition to its extreme emptying position because the discharge of liquid from the pocket 77 will impart an excess of weight to the spouts over the emptying pocket.

In this position the lug 80, secured to the tank will rest against the bar 3, consequently, the pin 13 will be free again from the sides of the guide 14.

It may be remarked that in the drawing the weighing weight is shown as being fixed to the weighing beam but of course this may as well be a loose fit.

Figure 4:
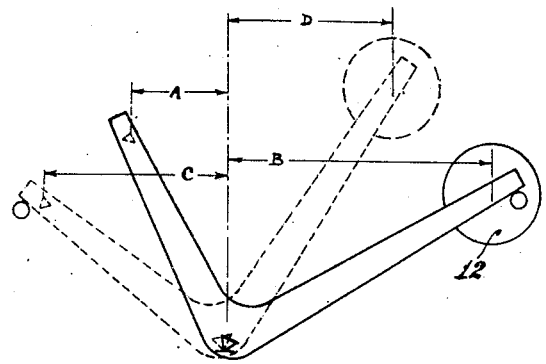
Fig. 4 is a diagrammatic view of the weighing beam with modified stops.

In Fig. 4 another construction of the weighing beam is shown. In this modification, the beam rests against fixed stops 85 and 86 in its extreme positions.

In the charging position, drawn in full lines, A represents the arm of the weight momentum of the tank and B that of the weighing weight 12; in the pouring position, drawn in dotted lines, these arms are C and D.

In the construction of Fig. 1, the tail 55 of the weighing beam, the movement of which is limited by adjustable stops 56 and 70, facilitates the correct adjustment of the weight of the charge and of the remainder tare.

Figure 5:
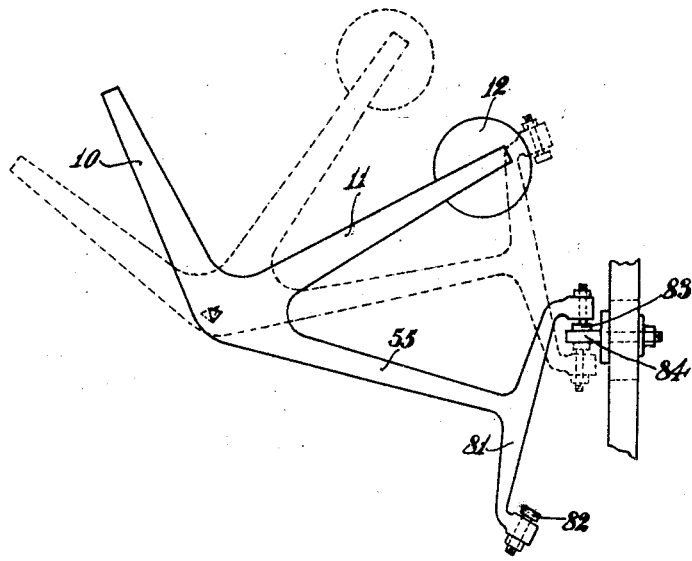
Fig. 5 is a side view of a special form of the device applied for the predetermination of the extreme positions of the weighing beam.

In Fig. 5 a special device is shown to fix the limit positions of the bell crank weighing beam according to the invention.

The end of the tail 55 is provided with a crossbeam 81 having two stops 82 and 83 which cooperate with an adjustable stop 84 when in the extreme positions. This stop 84 is situated at about the same height as the fulcrum of the weighing beam, thus preventing a shifting of the knife edges of this beam when being stopped.

That which I claim as my invention and desire to secure by Letters Patent is:

1. In a weighing apparatus of the class described, a pivotally mounted bell-crank shaped weighing beam, a receptacle to receive the matter to be weighed arranged on one arm of said beam and adapted when supporting material of a predetermined weight to tilt the weighing beam in one direction, a predetermined counterbalanced weight mass arranged upon the other arm of said beam for returning the beam to its normal position, and means for stopping the movement of the beam in said direction in such position that the receptacle is returned to its position by said weight mass when material of a predetermined weight has been discharged from said receptacle.

2. An apparatus of the kind claimed in claim 1 including a reservoir to contain the material to be weighed, valves for controlling the discharge of material from the reservoir, and means actuated by said receptacle and beam for controlling the operation of said valves.

3. A weighing apparatus including a pivotally mounted bell-crank-shaped weighing beam, a receptacle supported by one arm of said bell-crank and adapted to receive the material to be weighed, a weight mass carried by the other arm of the bell-crank and adapted to hold the receptacle in a predetermined position until said receptacle has been charged with a predetermined amount of the material being weighed, a reservoir, a valve controlling the discharge of material from the reservoir into said receptacle, means actuated by said bell-crank beam for controlling the movement of said valve and means for stopping the movement of the beam in one direction in such position that the receptacle is returned to its initial position by said weight mass when material of a predetermined weight has been discharged from said receptacle.

4. In a weighing scale adapted to weigh the amount of material discharged from a container as well as a quantity of material retained by the container, a pivotally mounted bell-crank-shaped weighing beam, a receptacle supported by one extremity of one arm of said beam and adapted to receive the material to be weighed, a weight mounted upon the other arm of said beam and adapted to return the receptacle to normal position after a certain amount of material has been discharged from the receptacle and before all of the contents of the receptacle have been discharged, and means for stopping the movement of the beam in one direction in such position that the receptacle is returned to its initial position by said weight when material of a predetermined weight has been discharged from said receptacle.

5. In a weighing apparatus, a pivotally mounted bell-crank-shaped weighing beam, a link pivotally mounted on one arm of said beam, a lever pivotally supported by said link and having a cam at one end and an adjustable weight at its other end, a supporting link pivotally carried by said lever, a receptacle pivotally connected to the supporting link and adapted to receive the material to be weighed, a lever having one of its ends pivotally mounted and its other end provided with a roller cooperating with said cam, a stop for limiting the downward movement of the last mentioned lever, a double armed lever pivotally mounted on the last mentioned lever, a supply reservoir for the material to be weighed, a chute for said reservoir, a valve for controlling the discharge of material from said chute, a shaft supported by said chute, an arm mounted on said shaft, a link having one of its ends connected to said arm and its other end connected to one end of the double armed lever, a leakage vat pivotally mounted on the lower portion of the chute for closing the lower end of the chute and preventing leakage therefrom, a link having one of its ends pivotally connected to said vat and its other end pivotally connected to the other end of the double armed lever, a second arm mounted on said shaft and adapted to engage said valve for raising the same, a third arm mounted on said shaft, a rod having one of its ends pivotally connected to the third arm, a stop for holding the other end of said rod to secure the valve in open position, the end of the rod engaging said stop being adapted to be struck by the weighted end of the first mentioned lever to disengage the rod from the stop and to permit the valve to close, a second rod having one of its ends pivotally connected to said vat, a stop for the other end of the second rod, and means actuated by the beam for releasing the second rod from its stop to permit the vat to close.

6. In a weighing apparatus of the class described, a reservoir adapted to contain material to be weighed, a discharge chute for said reservoir, a main valve for controlling the discharge of material from said chute, a funnel into which the chute discharges, a secondary valve for controlling the discharge of material from said funnel, a leakage vat for closing the lower end of said funnel, weighing mechanism, and means actuated by the weighing mechanism for opening the main valve and for closing the secondary valve and said leakage vat.

7. An apparatus as claimed in claim 1 having means for limiting the oscillating movement of the beam.

8. An apparatus as claimed in claim 1 in which the beam is provided with a tailpiece having a crosshead, adjustable stops arranged at the ends of said crosshead, and a fixed stop with which the adjustable stops cooperate.

9. A weighing apparatus including an elbow-shaped weighing beam mounted on a horizontal pivot, a weighing receptacle supported by one arm of said beam, arranged at one side of a vertical line passing through said pivot and adapted to turn the beam in one direction when a predetermined weight of material has been deposited in the receptacle, a weight mounted on the other arm of said beam and adapted to swing the beam in an opposite direction after a predetermined weight of material has been discharged from the receptacle and before the entire contents of the receptacle has been discharged, and means for stopping the movement of the beam in the first mentioned direction in such position that the receptacle is returned to its initial position by said weight when material of a predetermined weight has been discharged from said receptacle.

In testimony whereof I affix my signature.

BALTUS BOULOGNE.